Figure 1:
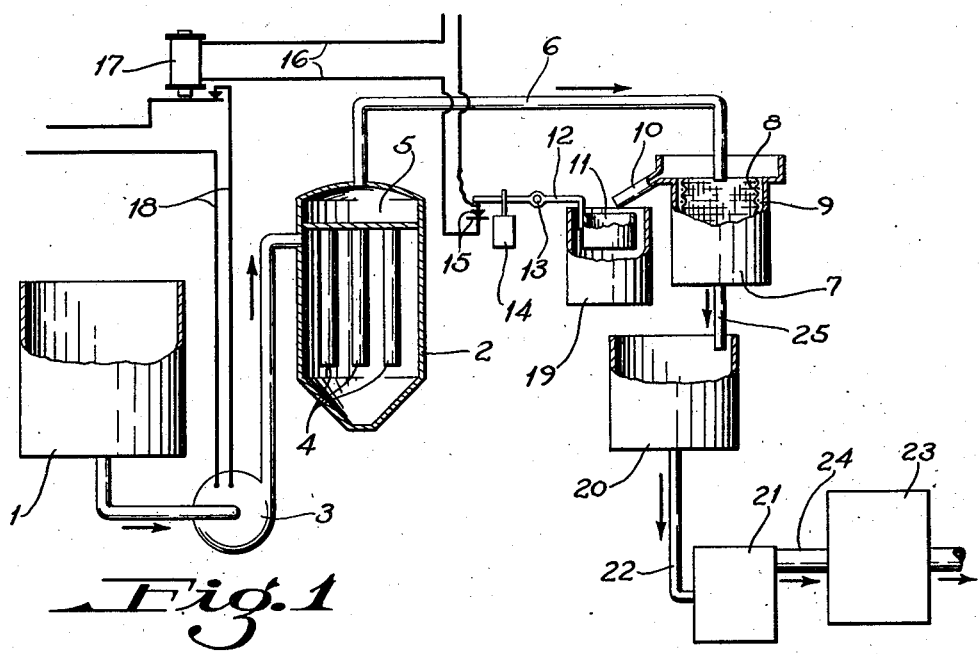

June 25, 1946.   D. M. HURT ET AL   2,402,553
SULPHURIC ACID MANUFACTURE AND APPARATUS THEREFOR
Filed June 10, 1941   2 Sheets-Sheet 1

David M. Hurt
George S. Stafford
Ernest J. Tauch
INVENTORS

BY Albert B. Griggs
ATTORNEY

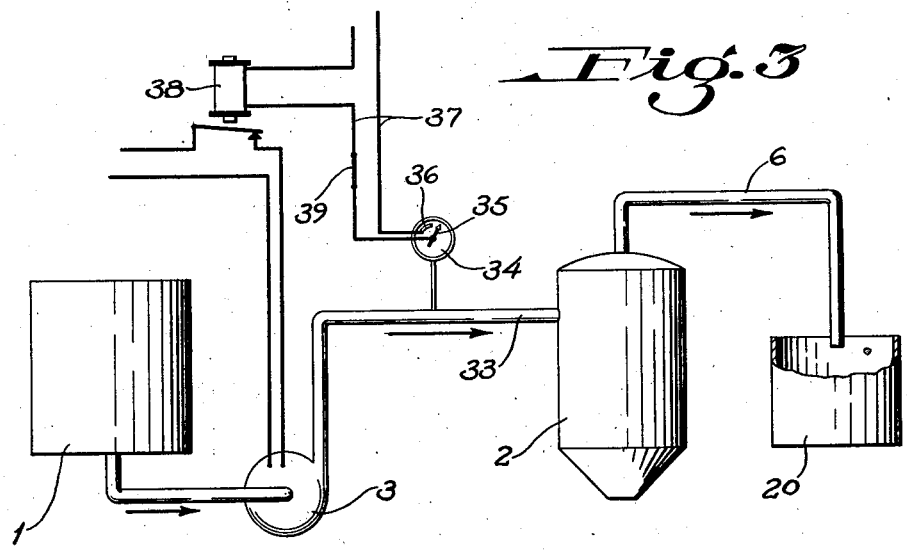
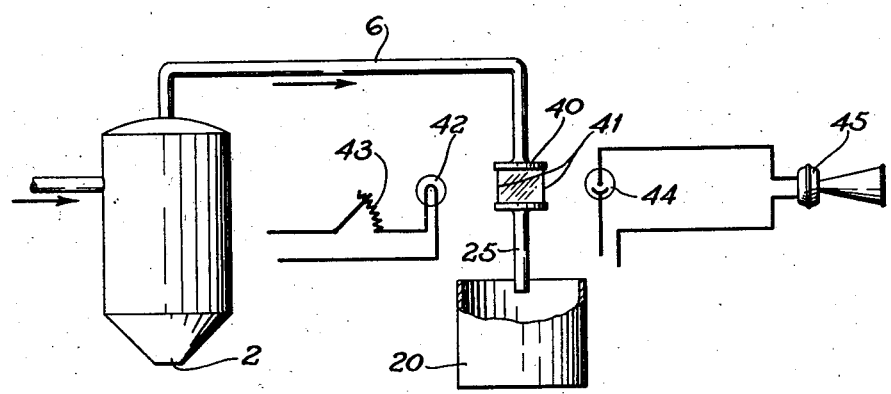
David M. Hurt
George S. Stafford
Ernest J. Tauch
INVENTORS

Patented June 25, 1946

2,402,553

UNITED STATES PATENT OFFICE 2,402,553

SULPHURIC ACID MANUFACTURE AND APPARATUS THEREFOR

David M. Hurt, Wilmington, Del., and George S. Stafford and Ernest J. Tauch, Cleveland Heights, Ohio, assignors to E. I. du Pont de Nemours & Company, Wilmington, Del., a corporation of Delaware Application June 10, 1941, Serial No. 397,362

1 Claim. (Cl. 23—261)

This invention relates to filtering sulphur for use in making sulphuric acid and more particularly to processes and apparatus in which frangible filter elements, used for removing solid matter from molten sulphur prior to converting the sulphur to sulphur dioxide and thence to sulphur trioxide, are used in combination with an alarm so that failure of the filter elements such as would permit sulphur containing solid matter to pass the filter causes the alarm to operate, whereby contamination of contact catalysts, used for converting to sulphur trioxide the sulphur dioxide formed by burning the sulphur, is avoided.

For the purpose of separating sulphur from rock, earth, gangue, and similar materials with which it is associated in natural deposits, it has been proposed to melt the sulphur, as with superheated steam, and "strain off" or filter such impurities out of the sulphur. While a considerable refinement of crude sulphur may thus be effected, the product is ordinarily not as satisfactory for purposes requiring a very pure sulphur as is the product mined by deep wells in the Gulf regions of the United States.

In making sulphuric acid by burning sulphur to sulphur dioxide and converting the sulphur dioxide to sulphur trioxide in contact catalytic converters, even the better grades of commercially available sulphur are none too satisfactory, and elaborate systems for purifying the sulphur dioxide gas prior to conversion have been considered essential. In such systems there is removed not only such recognized active catalyst poisons as arsenic and chlorides but also inert dust which, though not a catalyst poison, collects in the catalyst mass, interfering with the gas flow and gas contact with the catalyst. This dust contamination of contact converter masses is a problem equally serious with catalyst poisoning since sulphurs are commercially available which are usable without purification of the sulphur dioxide formed therefrom except for the dust content of the sulphur dioxide.

It has recently been proposed to avoid the presence of dust in sulphur dioxide by filtering sulphur containing solid matter, using filters of special design and constructed of media especially adapted for removing dust particles. Unfortunately, such filter media are liable to failure as, for instance, by reason of thermal shock, and since the fact of such failure having occurred is not ordinarily readily ascertained, considerable amounts of solid foreign matter might easily pass through the filter at the point of failure before the failure was discovered. In a contact system having no provision for purifying the sulphur dioxide gas formed by burning such sulphur the foreign matter passing through the filter would reach the catalyst mass with resultant undesirable contamination thereof.

It is an object of this invention to provide improved processes and apparatus for making sulphur trioxide from sulphur containing solid foreign matter. A further object is to provide processes and apparatus whereby sulphur trioxide may be produced by burning sulphur to sulphur dioxide and catalytically oxidizing the sulphur dioxide to sulphur trioxide in a contact converter without intermediate gas phase purification of the sulphur dioxide. A further object is to provide processes in which molten sulphur containing solid foreign matter may be filtered through media liable to failure and the filtered sulphur may be burned to sulphur dioxide and the sulphur dioxide converted in a contact catalytic converter to sulphur trioxide without purification of the sulphur dioxide. A further object is to provide means, cooperative with a sulphur filter liable to failure, whereby the supply of sulphur to the filter may be discontinued when failure of the filter occurs, and contamination of a contact catalyst converter employed using such sulphur may be avoided. Further objects of the invention will appear hereinafter.

The foregoing and related objects are accomplished according to this invention by apparatus including a filter liable to failure, means for continuously supplying molten sulphur containing solid matter to one side of said filter and for causing the sulphur to pass through the filter, and alarm means operative when the solids content of the filtered sulphur exceeds about .002 per cent and by processes in which sulphur trioxide is produced by burning sulphur to sulphur dioxide and oxidizing the sulphur dioxide to sulphur trioxide using a contact catalyst, the sulphur being obtained by filtering molten sulphur containing solid matter through a filter liable to failure, ascertaining whether the filtrate contains solid matter, and discontinuing the supply of sulphur to the filter when the solids content of the filtrate exceeds about .002 per cent.

The nature of this invention will be better understood by reference to the accompanying drawings wherein:

Figure 1 is a schematic representation of a preferred apparatus and process of the invention.

Figure 2:
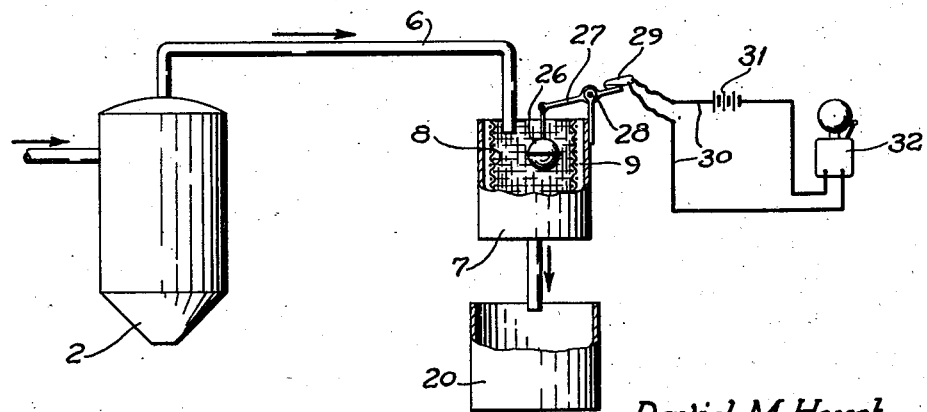

Figures 2, 3, and 4 are similar schematic representations of other preferred apparatus and processes of the invention, the filter construction being the same as in Figure 1.

A specific embodiment of this invention may be described with reference to Figure 1. Elemental sulphur containing impurities is melted in sulphur melter 1 and is then pumped to a sulphur filter 2 by means of a pump 3. The liquid sulphur passes through a porous element 4 while solid impurities are retained thereon. The filtered sulphur is collected in a header chamber 5 from where it is conducted to a guard filter 7. This guard filter comprises a 325 mesh stainless steel screen thimble 8 mounted in a shell having an external jacket 9, whereby the shell may be heated, and having an overflow 10 directed into a cup 11. The screen 8 is of such size that so long as filter elements 4 are in good condition and the solid impurities in the filtered sulphur are consequently low the molten sulphur immediately runs thru the screen and drains to storage tank 20. From the sulphur storage tank the filtered sulphur is conducted to a burner 21 and the sulphur dioxide thus formed passes to a contact converter 23 in which it is oxidized to sulphur trioxide.

When the solids content of the molten sulphur reaching the guard filter 7 exceeds a predetermined maximum, as for instance by reason of failure of a filter element 4, the screen in the guard filter becomes clogged and the level of the sulphur in the guard filter rises until ultimately a portion of it overflows through overflow 10. This overflow is directed into a cup 11 which was balanced, with the cup empty, on a beam 12 by means of a counter-weight 14 on the opposite side of a fulcrum 13, contact being made between contact points 15 with the beam at rest in a horizontal position. When cup 11 receives overflow from the guard filter 7, the beam is depressed to the right of the fulcrum and contact between points 15 is broken. This breaking of contact interrupts the flow of current in leads 16 and operating through a relay 17 interrupts the flow of current in circuit 18 supplying power to a motor driving the pump 3, thus discontinuing the flow of sulphur to the filter 2.

It will be seen from the foregoing description that the catalyst in the contact converter 23 is protected by the guard filter from contamination due to inadvertent and undiscovered breakage of a filter element 4, which being frangible is liable to breakage.

Another embodiment of the invention employing a slightly modified alarm mechanism may be described with reference to Figure 2 of the drawings. Molten elemental sulphur containing solid impurities is pumped into a sulphur filter 2. The liquid sulphur passes thru porous filter elements 4 while solid impurities are retained thereon. The filtered sulphur is collected in header chamber 5 and conducted thru pipe 6 to a guard filter 7 containing a screen 8 of such size that so long as filter elements 4 are in good condition the molten sulphur immediately runs through the screen and drains to storage tank 20 whence it may be burned in a sulphur burner and converted to sulphur trioxide in a contact converter.

When the solid impurities content of the molten sulphur exceeds a predetermined maximum, for instance by reason of breakage of a filter element 4, the screen in the guard filter becomes clogged and the level of sulphur in the guard filter rises. The rising sulphur level pushes up a float 26 connected with a beam 27 rotatable about a fulcrum 28. Likewise rotation of a beam 28 closes a mercury switch 29, thereby causing a flow of current in an alarm circuit 30 and causing an alarm bell 32 to ring, thereby warning the operator to discontinue the feed of molten sulphur to the filter. The pump motor power supply may of course be turned off by automatic means, not shown, responsive to a current flow in the alarm circuit 30.

Another embodiment of this invention employing a somewhat modified apparatus may be described with reference to Figure 3 of the drawings.

Elemental sulphur containing solid impurities is melted in a sulphur melter 1 and pumped to a sulphur filter 2 by means of a pump 3, the sulphur filter comprising filter elements 4 which unite in a header 5 and deliver the filtered sulphur to a storage tank 20 by means of a pipe 6. On the discharge side of the pump is connected a pressure gauge 34 upon the pointer of which is mounted a contact point 35 so positioned as to make contact with a contact slide 36 upon the dial of the gauge and corresponding with the range of low pressure on the gauge. These contacts 35 and 36 form part of a relay control circuit including a control current supply and an auxiliary switch 39. In starting the pump, switch 39 is opened until pressure on the gauge has been built up past the point where contact between points 35 and 36 is made. The switch 39 is then closed. When the solids content of the filtered sulphur exceeds a predetermined maximum during operation a pressure drop between the pump and the sulphur filter occurs because of the decrease in the resistance of the filter. This pressure drop causes contact point 35 to swing back and touch slide contact 36, thereby closing the relay circuit. This relay circuit operates through a relay 38 to shut off the power in an electric motor driving the pump 3.

Another embodiment of this invention employing an alternative form of alarm means may be described with reference to Figure 4 of the drawings.

Molten sulphur containing solid impurities is pumped into a sulphur filter 2 where it passes through frangible filter elements 4 and hence through a flowsight 40 to a sulphur storage tank 20. This flowsight has parallel glass faces 41. On one side of the flowsight is an incandescent lamp 42 and a circuit including a rheostat 43 and a source of electric current. On the opposite side of the flowsight is a photoelectric tube 44 in a circuit which when closed by the operation of relay (not shown) includes a current supply and an electric siren 45. The incandescent lamp and the photoelectric tube and relay are so located that light from the lamp must pass through the flowsight to reach the tube and the relay is of the type which closes the circuit when the light reaching the photoelectric tube falls below a predetermined maximum. Thus, so long as the filtered sulphur passing through sight glass 40 is of clear color, the alarm means does not operate, but when the molten sulphur becomes cloudy, as by reason of the failure of a filter element 4, the light from the incandescent lamp is unable to penetrate to the photoelectric cell, the photoelectric relay operates and alarm is given by the siren. An operator may thereupon discontinue the supply of molten sulphur to the filter or automatic means responsive to current flow in the alarm circuit may be added to stop the supply of sulphur.

From the foregoing descriptions of the drawings it will be readily apparent that various alarm means and various modifications of the processes shown are possible without departing from the spirit of the invention.

The filter means liable to failure may be of various types. For purposes of illustration in the foregoing examples there have been shown filters with frangible filter elements. These filter elements may, for instance, be porous carborundum or aluminum oxide tubes. Alternatively, a mechanical filter in which the filter surface is subjected to mechanical action in a manner such that wear occurs may be protected according to the invention so that if wear proceeds to the point of filter failure, the fact is made known.

The alarm means operative upon failure of the sulphur filter may be of various types and may be operative by reason of the presence of solid matter in the filtered sulphur or by reason of factors which would inherently cause the presence of solid matter in the filtered sulphur. In the foregoing examples certain specific embodiments have been shown and a variety of other forms will readily suggest themselves. For instance, the filtered sulphur may be passed alternately into two storage tanks, the sulphur from one storage tank being used, after visual inspection for suspended matter, while the other tank is filling.

In its manner of exercising control on the sulphur filter the alarm means may be automatic or manual. If automatic, the means may operate to control a pump or similar device for causing sulphur to flow through the filter. If manual, the alarm means may be any suitable warning device such as the bell or siren of Figures 2 and 4 or such other warning mechanisms as a flasher light, a buzzer or a semaphore.

In alarm means employing a guard filter as shown in Figures 1 and 2 various modifications are possible. For instance, instead of the open guard filter shown in these figures, a closed filter could be used with control means operating when the back pressure in such a closed filter exceeded the normal back pressure for molten sulphur containing not more than about .002 per cent of solid matter.

While the application of a process of this invention makes unnecessary the purification of sulphur dioxide obtained by burning of the sulphur, insofar as dust contamination of a contact converter is concerned, it will be understood that soluble impurities may exist in the sulphur which would require a purification step in order to protect the contact catalyst. When such poisons are not present, however, intermediate purification of sulphur dioxide may in a process of this invention be dispensed with.

The temperatures at which the sulphur filtration processes and apparatus of this invention should be operated are those at which the mobility of the molten sulphur presents a minimum of handling difficulties. Ordinarily the temperature will be maintained at about 150° C.

While in the foregoing description of this invention there have been shown certain specific apparatus and processes, it will be understood that one skilled in the art without departing from the spirit of the invention may readily filter molten sulphur through a filter liable to failure and in numerous ways detect filter failure and discontinue the filtration when the solids content of the filtrate exceeds a predetermined maximum.

We claim:

In apparatus for producing $SO_3$ from molten sulphur, a filter for liquid sulphur of frangible, substantially inflexible material, a second filter of sufficiently fine mesh as to be clogged by solid material, removable by said first filter and of such small capacity as to be quickly filled on clogging, a sulphur burner, a catalytic converter, conduit means between said first and second filter, and from said second filter to said burner, and means actuated by a rising level of molten sulphur in said second filter arranged to operate an external indicator system whereby alarm is given by said indicator system upon the presence of an undue amount of solid impurities in the sulphur passing through said first filter due to breakage of said first filter.

DAVID M. HURT.
GEORGE S. STAFFORD.
ERNEST J. TAUCH.